E. I. BRADDOCK.
CORNER BEAD.
APPLICATION FILED NOV. 14, 1914.
1,247,627.
Patented Nov. 27, 1917.
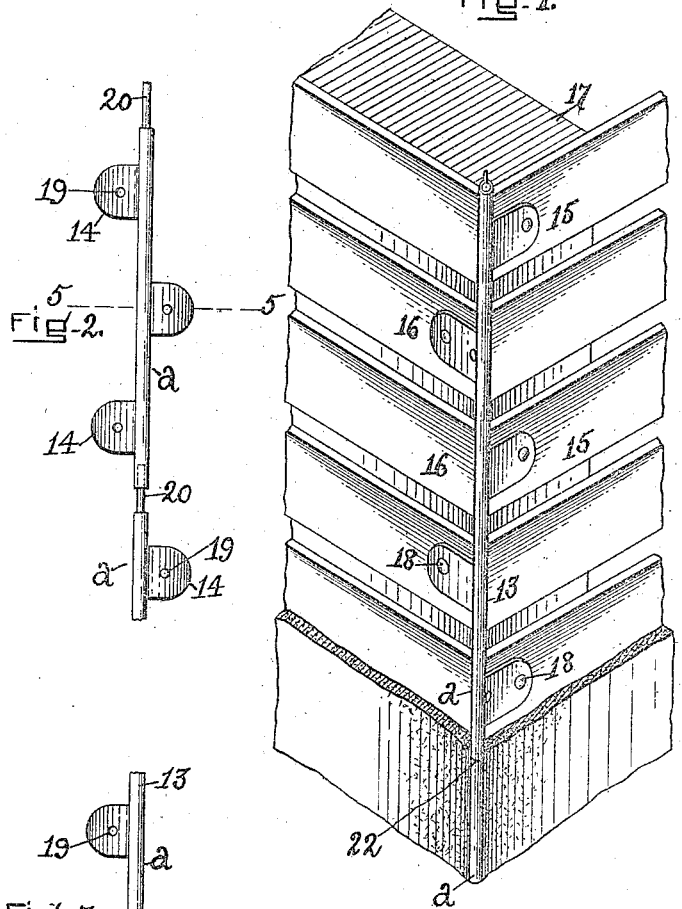
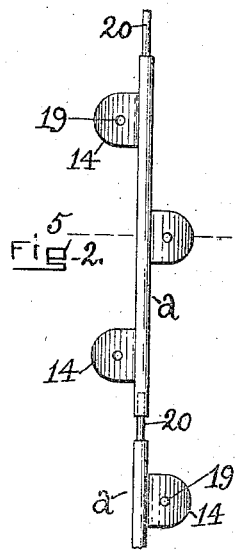
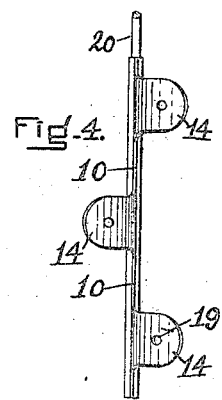
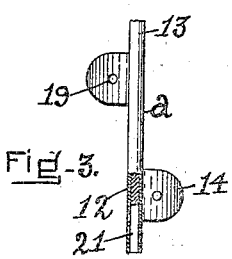
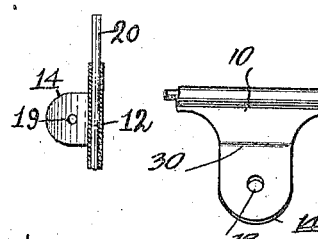
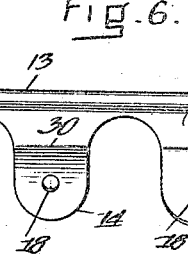
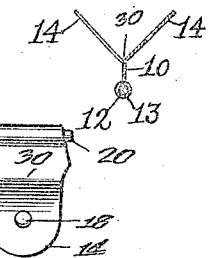
WITNESSES:
John Buckler,
J. Murphy
INVENTOR:
Edward J. Braddock
by Jas. H. Churchill
Atty.

UNITED STATES PATENT OFFICE.

EDWARD I. BRADDOCK, OF WINCHESTER, MASSACHUSETTS, ASSIGNOR, BY DIRECT AND MESNE ASSIGNMENTS, TO LAMB & NASH COMPANY, OF KITTERY, MAINE, A CORPORATION OF MAINE.

CORNER-BEAD.

1,247,627.      Specification of Letters Patent.      Patented Nov. 27, 1917.

Application filed November 14, 1914. Serial No. 872,246.

*To all whom it may concern:*

Be it known that I, EDWARD I. BRADDOCK, a citizen of the United States, residing in Winchester, in the county of Middlesex and State of Massachusetts, have invented an Improvement in Corner-Beads, of which the following description, in connection with the accompanying drawings, is a specification, like characters on the drawings representing like parts.

This invention relates to a reinforced sheet metal device provided at one edge with a hollow bead and at its opposite edge with a series of arms spaced apart, which is especially designed and adapted to form a metal corner bead for use in buildings.

The present invention has for its object to provide a device from which a corner bead, which is inexpensive, light and strong, can be made in short lengths or sections capable of being fitted together so as to make a practically imperceptible joint between contiguous sections, so that a corner bead made up of short sections has the appearance of a continuous length or one piece corner bead, while the short sections may be made of any length desired or required to meet the particular demands, and thereby avoid waste.

To this end, the device is provided with a substantially flat sheet metal member having one edge folded to form a hollow bead and having extended from its other edge outwardly bent arms alternately projecting in opposite directions below said bead and separated by spaces extended into said substantially flat member above the line in which the bends of the arms are located. The hollow bead may have located within it a reinforcing wire or metal rod which is arranged with relation to the hollow bead, so that the said wire may extend beyond the same to form a coupling projection which is extended into a socket in the end of a coöperating corner bead section, as will be described.

The particular features of the invention will be pointed out in the claim at the end of this specification.

Figure 1 represents in elevation the corner of a wall provided with a metal corner bead embodying this invention.

Fig. 2 is an elevation, showing one corner bead section partially engaged with another, only a part of which is shown.

Fig. 3, a detail in section to illustrate the coupling projection on one corner bead section and the socket in the coöperating corner bead section.

Fig. 4, a rear elevation of a portion of the corner bead shown in Fig. 1.

Fig. 5, a section on the line 5—5, Fig. 2, and Fig. 6, a side elevation of a portion of the corner bead shown in Fig. 1.

Referring to the drawings *a* represents a section of a corner bead embodying this invention and composed of a substantially flat sheet metal member 10, and a reinforcing member 12. The member 10 is folded at one edge to form a hollow bead 13, and has extended from its other edge or unfolded portion a series of outwardly bent arms 14, projecting in opposite directions below the said bead and separated by spaces substantially equal to the width of one of the arms and extended into said substantially flat member above the line 30 (see Figs. 5 and 6) in which the bends of arms 14 are located.

The alternately projecting arms engage the intersecting surfaces 15, 16, of a wall 17 to which they are fastened in any suitable manner, as, for instance, by nails 18 driven through holes 19 in said arms, and the spaces extended into the substantially flat member 10 form bonding apertures in said member through which the plaster applied to one wall 15 may bond with the plaster applied to the other wall 16.

The reinforcing member 12 is made as a wire or metal rod, which is preferably of the same length as the sheet metal member 10, and has the greater portion of its length located in the hollow bead 13, but is preferably arranged in relation to the said bead, so that a portion of the wire 12 extends out of the hollow bead beyond one end thereof to form a coupling projection 20, and so that the opposite end of the said wire is removed from the opposite end of the bead 13 to leave a socket 21 for the reception of the coupling projection 20 of another section of the corner bead. The reinforcing wire or metal rod 12 is secured in fixed relation to the sheet metal member by folding the portion of the latter which forms the bead over upon the wire.

By providing the sheet metal member of the corner bead with a hollow bead containing a reinforcing wire or rod arranged with relation thereto, so as to form a coupling projection 20 at one end and a socket 21 at the other end, the corner bead section may be made either short or long, not only convenient for transporting and handling on the job but capable of being assembled in a minimum time to form a corner bead of any desired length and having practically imperceptible joints, one of which is shown in Fig. 1 and numbered 22, so that a corner bead composed of substantially short sections has the appearance of a single or continuous length of corner bead. By making the coupling projection 20 approximately equal in length to the socket 21, the continuous length of corner bead has its hollow bead 13 reinforced by a practically continuous wire or rod for the entire length of the corner bead, which enables the corner bead to withstand a heavy or severe blow without being crushed or distorted.

Claim:

A metal corner bead section composed of a substantially flat member which is folded at one edge to form a longitudinally extended bead and has extended from it outwardly bent arms alternately projecting in opposite directions below said bead and separated by spaces extended into said substantially flat member above the line in which the bends of the arms are located.

In testimony whereof, I have signed my name to this specification in the presence of two subscribing witnesses.

EDWARD I. BRADDOCK.

Witnesses:
JAS. H. CHURCHILL,
J. MURPHY.

Copies of this patent may be obtained for five cents each, by addressing the "Commissioner of Patents, Washington, D. C."